United States Patent
Matsumoto

(10) Patent No.: US 7,881,472 B2
(45) Date of Patent: Feb. 1, 2011

(54) QUANTUM KEY DISTRIBUTION METHOD AND COMMUNICATION APPARATUS

(75) Inventor: Wataru Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1139 days.

(21) Appl. No.: 10/588,803

(22) PCT Filed: Feb. 10, 2004

(86) PCT No.: PCT/JP2004/001385

§ 371 (c)(1),
(2), (4) Date: Aug. 9, 2006

(87) PCT Pub. No.: WO2005/076519

PCT Pub. Date: Aug. 18, 2005

(65) Prior Publication Data

US 2008/0144833 A1    Jun. 19, 2008

(51) Int. Cl.
*H04L 9/08* (2006.01)
*H04L 9/12* (2006.01)
*H04L 9/00* (2006.01)
*H04L 25/00* (2006.01)

(52) U.S. Cl. .......... 380/260; 380/44; 380/278; 380/277; 713/168; 713/171; 714/2; 714/746; 714/758; 714/798

(58) Field of Classification Search .......... 380/260
See application file for complete search history.

(56) References Cited

U.S. PATENT DOCUMENTS

| | | | |
|---|---|---|---|
| 5,732,139 A * | 3/1998 | Lo et al. | 380/28 |
| 6,061,823 A | 5/2000 | Nara | |
| 7,403,623 B2 * | 7/2008 | Cerf et al. | 380/278 |
| 7,570,767 B2 * | 8/2009 | Lo | 380/263 |
| 2002/0168033 A1 | 11/2002 | Suzuki et al. | |

FOREIGN PATENT DOCUMENTS

| | | |
|---|---|---|
| JP | 10-303759 A | 11/1998 |
| JP | 2001-230677 A | 8/2001 |
| KR | 1020040087066 A | 10/2004 |

(Continued)

OTHER PUBLICATIONS

Buttler, W., et al, 'Fast, efficient error reconciliation for quantum cryptography', Univ. of Ca., Los Alamos National Laboratory, Los Alamos, NM 87545, (Mar. 20, 2002), entire document, http://cdsweb.cern.ch/record/543746/files/0203096.pdf.*

(Continued)

*Primary Examiner*—Edan Orgad
*Assistant Examiner*—Ronald Baum
(74) *Attorney, Agent, or Firm*—Birch, Stewart, Kolasch & Birch, LLP.

(57) ABSTRACT

In a quantum key distributing method of the present invention, a communication apparatus on a reception side performs error correction using parity check matrixes for an LDPC code that have an extremely high error correction ability. In the quantum key distributing method of the present invention, a cyclic code syndrome generated by a communication apparatus on a transmission side and an estimated cyclic code syndrome generated based on an estimated word after error correction are compared to perform error detection for the estimated word.

7 Claims, 9 Drawing Sheets

FOREIGN PATENT DOCUMENTS

| | | |
|---|---|---|
| KR | 1020060003329 A | 1/2006 |
| KR | 1020060059853 A | 6/2006 |

OTHER PUBLICATIONS

Assche, G.V., et al, ' Reconciliation of a Quantum-Distributed Gaussian Key ', IEEE Transactions on Information Theory, vol. 50, No. 2, Feb. 2004, pp. 394-400, http://citeseerx.ist.psu.edu/viewdoc/download?doi=10.1.1.104.2483&rep=rep1&type=pdf.*

"Quantum Cryptography", ETRI, pp. 70-83.

Bennett, C.H. et al., In Proceedings of IEEE Conference on Computers, Systems and Signal Processing, Bangalore, India, pp. 175-179 (Dec. 10-12, 1984).

Brassard, G. et al., In Advances in Cryptology—EUROCRYPT'93, Lecture Notes in Computer Science 765, pp. 410-423.

Yuichi Ishizuka et al., 2004 Nen Ango to Joho Security Symposium Yokoshu, vol. I, Jan. 27, 2004, pp. 253 to 258.

MacKay, D.J.C. et al., IEE Electronics Letters, vol. 32, No. 18, Aug. 29, 1996, pp. 1645 to 1646.

Symposium on Cryptography and Information Security. Hamamatsu, Japan, Jan. 26-29, 2003, The Institute of Electronics Information and Communication Engineers) Yodai Watanabe et al. (6 pages).

* cited by examiner

FIG.6

| RATE | 0.5 |
|---|---|
| N | 12.6 |

| i | $\gamma_i$ | $\lambda(\gamma_i)$ | $n(\gamma_i)$ |
|---|---|---|---|
| 1 | 2 | 0.27381 | 69 |
| 2 | 3 | 0.10714 | 18 |
| 3 | 8 | 0.61905 | 39 |
| u | | $\rho_u$ | nu |
| 8 | | 1 | 63 |

$$CRC = \begin{bmatrix} 1 & 1 & 1 & 0 & 1 & 0 & 0 \\ 0 & 1 & 1 & 1 & 0 & 1 & 0 \\ 0 & 0 & 1 & 1 & 1 & 0 & 1 \end{bmatrix}$$

QUANTUM KEY DISTRIBUTION METHOD AND COMMUNICATION APPARATUS

TECHNICAL FIELD

The present invention relates to a quantum key distribution method capable of generating a common key, security of which is highly guaranteed, and more particularly, to a quantum key distribution method capable of correcting a data error using an error correction code and a communication apparatus capable of realizing the quantum key distribution.

BACKGROUND ART

A conventional quantum cryptograph system is explained below. In recent years, optical communication is widely used as a high-speed large-capacity communication technology. In such an optical communication system, communication is performed according to ON/OFF of light and a large quantity of photons are transmitted when light is ON. Thus, the optical communication system is not a communication system in which a quantum effect is developed directly.

On the other hand, in the quantum cryptograph system, photons are used as communication media to transmit information of one bit using one photon such that a quantum effect such as uncertainty principle is developed. In this case, when a wiretapper selects a base at random and measures photons without knowing a quantum state such as polarization and a phase of the photons, the quantum state changes. Therefore, on the reception side, it is possible to recognize, by confirming the change in the quantum state of the photons, whether transmitted data has been wiretapped.

FIG. 10 is a schematic of the conventional quantum key distribution using polarized light. For example, a measuring device, which is capable of identifying polarized light in horizontal and vertical directions, identifies light polarized in the horizontal direction (0°) and light polarized in the vertical direction (90°) on a quantum communication path correctly. On the other hand, a measuring device, which is capable of identifying polarized light in oblique directions (45° and 135°), identifies light polarized in the 45° direction and 135° direction on a quantum communication path correctly.

In this way, the respective measuring devices can recognize light polarized in the defined directions correctly. However, for example, when the measuring device, which is capable of identifying polarized light in the horizontal and vertical directions (0° and 90°), measures light polarized in an oblique direction, the measuring device identifies light polarized in the horizontal direction and light polarized in the vertical direction at random at a probability of 50 percent, respectively. In other words, when the measuring device that does not cope with identifiable polarization directions is used, it is impossible to identify a direction in which light is polarized even if a result of measurement by the measuring device is analyzed.

In the conventional quantum key distribution shown in FIG. 10, a sender and a receiver share a key while keeping the key secret from wiretappers (see, for example, Nonpatent Literature 1). Note that the sender and the receiver can use a public communication path other than the quantum communication path.

A procedure for sharing a key is explained. First, the sender generates a random number sequence (a sequence of 1 and 0: transmission data) and determines transmission codes (+: a code corresponding to the measuring device capable of identifying light polarized in the horizontal and vertical directions, x: a code corresponding to the measuring device capable of identifying light polarized in the oblique directions) at random. A polarization direction of light to be transmitted is automatically determined according to combinations of the random number sequence and the transmission codes. Light polarized in the horizontal direction according to a combination of 0 and +, light polarized in the vertical direction according to a combination of 1 and +, light polarized in the 45° direction according to a combination of 0 and x, and light polarized in the 135° direction according to a combination of 1 and x are transmitted to the quantum communication path, respectively (transmission signals).

The receiver determines reception codes (+: a code corresponding to the measuring device capable of identifying light polarized in the horizontal and vertical directions, x: a code corresponding to the measuring device capable of identifying light polarized in the oblique directions) at random and measures light on the quantum communication path (reception signals). The receiver obtains reception data according to combinations of the reception codes and the reception signals. The receiver obtains 0, 1, 0, and 1 as reception data according to a combination of the light polarized in the horizontal direction and +, a combination of the light polarized in the vertical direction and +, a combination of the light polarized in the 45° direction and x, and a combination of the light polarized in the 135° direction and x, respectively.

In order to check whether measurement for the receiver has been performed by a correct measuring device, the receiver sends the reception codes to the sender thorough the public communication path. The sender, who has received the reception codes, checks whether the measurement has been performed by a correct measuring device and returns a result of the check to the receiver through the public communication path.

The receiver keeps only the reception data corresponding to the reception signals received by the correct measuring device and disposes of other reception data. At this point, the reception data kept can be shared by the sender and the receiver surely.

The sender and the receiver send a predetermined number of data selected from the shared data to each other through the public communication path. Then, the sender and the receiver check whether the reception data coincide with the data held by the sender and the receiver themselves. For example, if at least one data among the data checked does not coincide with the data held by the sender and the receiver, the sender and the receiver judge that a wiretapper is present, dispose of the shared data, and repeat the procedure for sharing a key from the beginning. On the other hand, when all the data checked coincide with the data held by the sender and the receiver, the sender and the receiver judge that no wiretapper is present, dispose of the data used for the check, and use the remaining shared data as a shared key for the sender and the receiver.

On the other hand, as an application of the conventional quantum key distribution method, for example, there is a quantum key distribution method that is capable of correcting a data error on a transmission path (see, for example, Nonpatent Literature 2).

In this method, to detect a data error, a sender divides transmission data into plural blocks and sends a parity for each block on a public communication path. Then, a receiver compares the parity for each block received through the public communication path and a parity of a corresponding block in reception data to check a data error. In this case, when there is a different parity, the receiver returns information indicating a block of the different parity on the public communication path. The sender further divides the pertinent block into a former half block and a latter half block and returns, for example, a former half parity on the public communication path (binary search). Thereafter, the sender and the receiver specify a position of an error bit by repeatedly executing the binary search. Finally, the receiver corrects the bit.

Moreover, assuming that a parity is judged as correct because of an even number of errors regardless of an error in data, the sender rearranges transmission data at random (random replacement) to divide the transmission data into plural blocks and performs the error correction processing with the binary search again. Then, the sender repeatedly executes this error correction processing with the random replacement to thereby correct all the data errors.

Nonpatent Literature 1

Bennett, C. H. and Brassard, G., "Quantum Cryptography", Public Key Distribution and Coin Tossing, In Proceedings of IEEE Conference on Computers, System and Signal Processing, Bangalore, India, pp. 175-179 (December 1984).

Nonpatent Literature 2

Brassard, G. and Salvail, L., "Secret-Key Reconciliation by Public Discussion", In Advances in Cryptology-EUROCRYPT '93, Lecture Notes in Computer Science 765, pp. 410-423 (1993).

However, an error communication path is not assumed in the conventional quantum key distribution shown in FIG. 10. Therefore, when there is an error, the sender and the receiver dispose of the common data (the common key) judging that a wiretapping act is performed. This extremely deteriorates efficiency of generation of a common key depending on a transmission path.

In the quantum key distribution method capable of correcting a data error on the transmission path, parities are exchanged an extremely large number of times to specify an error bit and the error correction processing by the random replacement is performed for a predetermined number of times. Therefore, a great deal of time is consumed for the error correction processing.

The present invention has been devised in view of the circumstances and it is an object of the present invention to provide a quantum key distribution method that is capable of generating a common key, security of which is highly guaranteed, while correcting a data error on a transmission path using an error correcting code having an extremely high property.

DISCLOSURE OF INVENTION

A quantum key distributing method according to one aspect of the present invention is for a quantum cryptographic system including a communication apparatus on a transmission side that transmits, in a predetermined quantum state, a random number sequence forming a basis of an encryption key to a quantum communication path and a communication apparatus on a reception side that measures photons on the photon communication path. The quantum key distributing method includes a check matrix generating step at which the respective communication apparatuses generate an identical parity check matrix (a matrix with an element "0" or "1") (corresponding to steps S1 and S11 according to an embodiment described later); a cyclic code generating step at which the communication apparatus on the transmission side generates a cyclic code (CRC: Cyclic Redundancy Check) for error detection (corresponding to step S2); a transmitting and receiving step at which the communication apparatus on the reception side holds reception data with probability information obtained as a result of measuring a light direction with a measuring device capable of correctly identifying the light direction and the communication apparatus on the transmission side holds transmission data (a part of the random number sequence) corresponding to the reception data (corresponding to steps S3, S4, S12, and S13); an information notifying step at which the communication apparatus on the transmission side notifies, via a public communication path, the communication apparatus on the reception side of error correction information generated based on the parity check matrix and the transmission data and error detection information generated based on the cyclic code and the transmission data (corresponding to steps S5 and S14); a transmission data estimating step at which the communication apparatus on the reception side estimates the transmission data based on the parity check matrix, the reception data with probability information, the error correction information, and the error detection information (corresponding to step S15); and an encryption key generating step at which the respective communication apparatuses discard a part of the transmission data according to an amount of information laid open to the public and generate an encryption key using remaining information (corresponding to steps S6 and S16).

According to the present invention, for example, a data error of shared information is corrected using parity check matrixes for an "Irregular-LDPC code", which are definite and have stable characteristics, error detection for shared information (estimated word) is performed using the cyclic code CRC, and, thereafter, a part of the shared information is discarded according to error correction information laid open to the public.

BRIEF DESCRIPTION OF DRAWINGS

FIG. 6 is a diagram of a final weight distribution of columns $\lambda(\gamma_i)$ and a final weight distribution of rows $\rho_u$;

BEST MODE(S) FOR CARRYING OUT THE INVENTION

Exemplary embodiments of a quantum key distribution method and a communication apparatus according to the present invention are explained in detail below with reference to the accompanying drawings. Note that the present invention is not limited by the embodiments. Quantum key distribution using polarized light is explained below as an example. However, the present invention is also applicable to, for example, quantum key distribution using a phase, quantum key distribution using a frequency, and the like. There is no specific limitation on what kind of quantum state is used.

Quantum key distribution is a key distribution system, security of which is guaranteed regardless of a computing ability of a wiretapper. For example, to generate a shared key efficiently, it is necessary to remove an error of data that is caused when the data is transmitted through a transmission path. Thus, according to the present embodiment, quantum key distribution for performing error correction using a Low-Density Parity-Check (LDPC) code, which is known as having an extremely high property, is explained.

Figure 1:
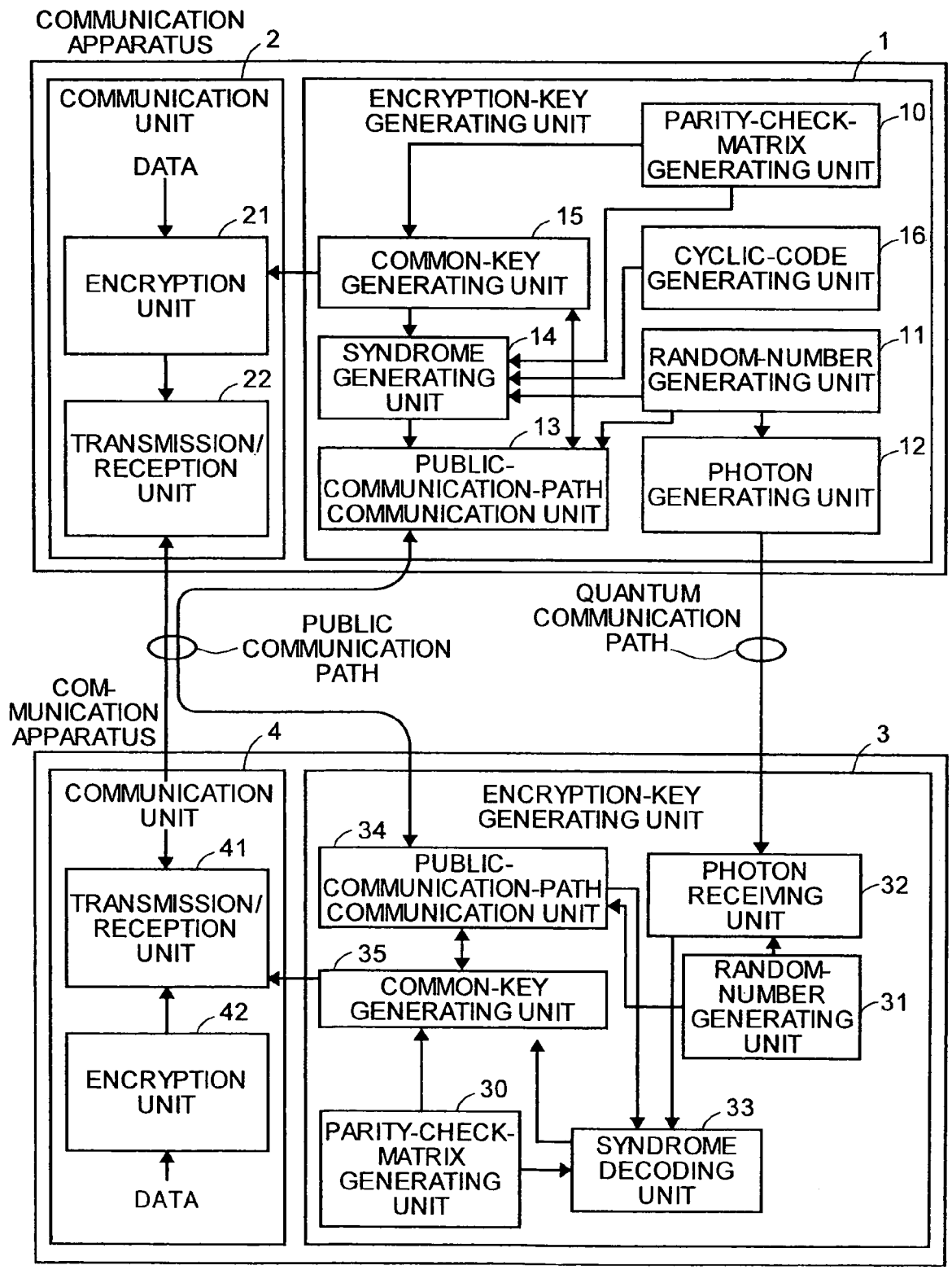
FIG. 1 is a diagram of a constitution of a quantum cryptographic system according to the present invention.

FIG. 1 is a block diagram of a structure of a quantum cryptograph system (communication apparatuses on a transmission side and a reception side) according to the present invention. This quantum cryptograph system includes the communication apparatus on the transmission side, which has a function of transmitting information $m_a$, and the communication apparatus on the reception side, which has a function of receiving the information $m_a$ affected by noise and the like on a transmission path, that is, information $m_b$.

The communication apparatus on the transmission side includes an encryption-key generating unit 1, which transmits the information $m_a$ through a quantum communication path, transmits a syndrome $S_A$ thorough a public communication path, and generates an encryption key (a common key common to the transmission side and the reception side) based on the transmitted information, and a communication unit 2 in which a transmission/reception unit 22 transmits and receives data, which is encrypted by an encryption unit 21 based on the encryption key, through the public communication path. The communication apparatus on the reception side includes an encryption-key generating unit 3, which receives the information $m_b$ through the quantum communication path, receives the syndrome $S_A$ through the public communication path, and generates an encryption key (a common key common to the reception side and the transmission side) based on information on the received information, and a communication unit 4 in which a transmission/reception unit 41 transmits and receives data, which is encrypted by an encryption unit 42 based on the encryption key, through the public communication path.

The communication apparatus on the transmission side transmits light polarized in a predetermined direction using a polarization filter to the communication apparatus on the reception side as the information $m_a$ to be transmitted on the quantum communication path. On the other hand, the communication apparatus on the reception side identifies light polarized in the horizontal direction (0°), light polarized in the vertical direction (90°), light polarized in the 45° direction, and light polarized in the 135° direction on the quantum communication path using a measuring device capable of identifying polarized light in the horizontal and vertical directions (0° and 90°) and a measuring device capable of identifying polarized light in the oblique directions (45° and 135°). Not that the respective measuring devices can recognize light polarized in the defined directions correctly. However, for example, when the measuring device, which is capable of identifying polarized light in the horizontal and vertical directions (0° and 90°), measures light polarized in an oblique direction, the measuring device identifies light polarized in the horizontal direction and light polarized in the vertical direction at random at a probability of 50 percent, respectively. In other words, when the measuring device that does not cope with identifiable polarization directions is used, it is impossible to identify a direction in which light is polarized even if a result of measurement by the measuring device is analyzed.

Figure 2:
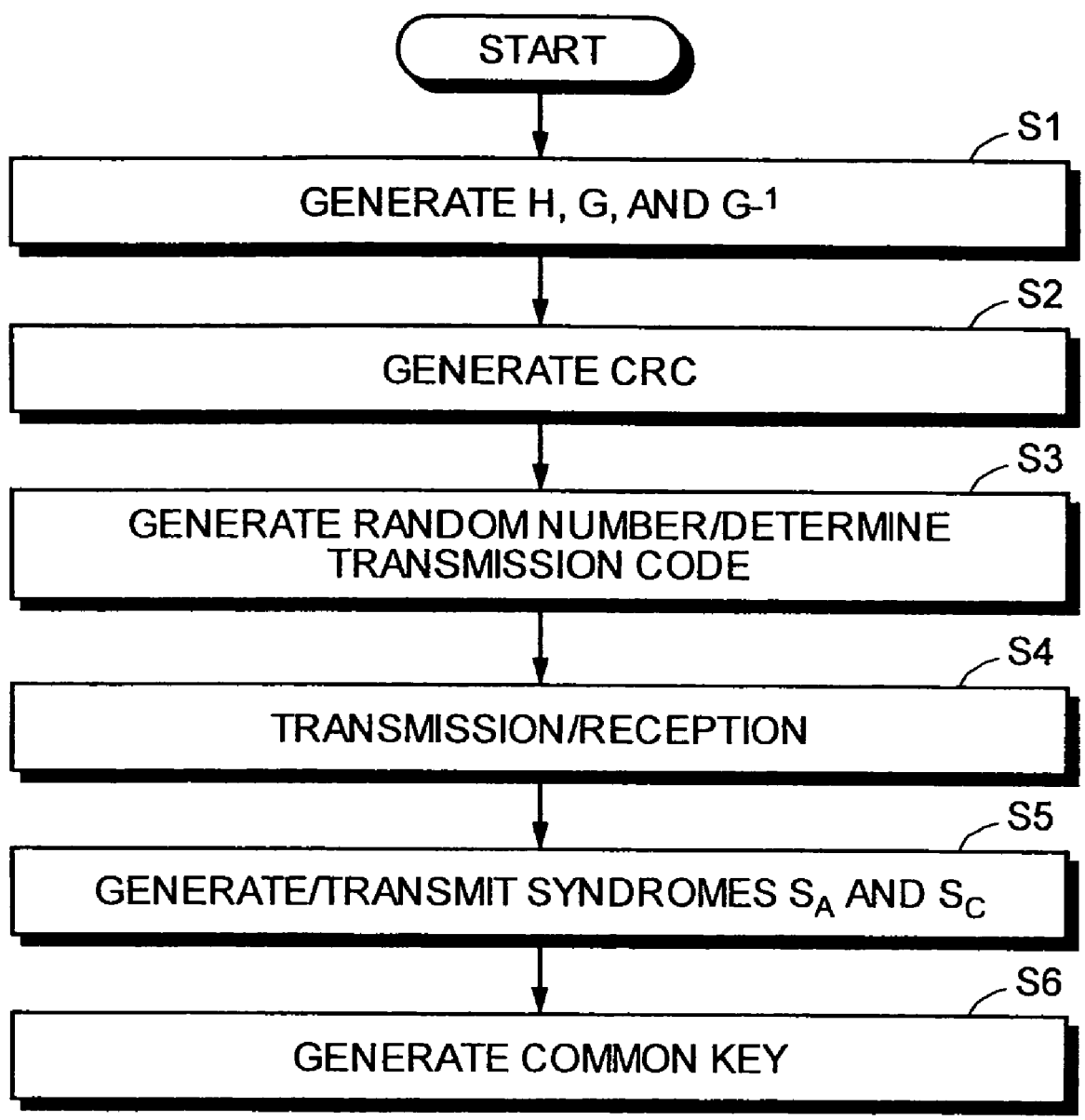
FIG. 2 is a flowchart of quantum key distribution.
Figure 3:
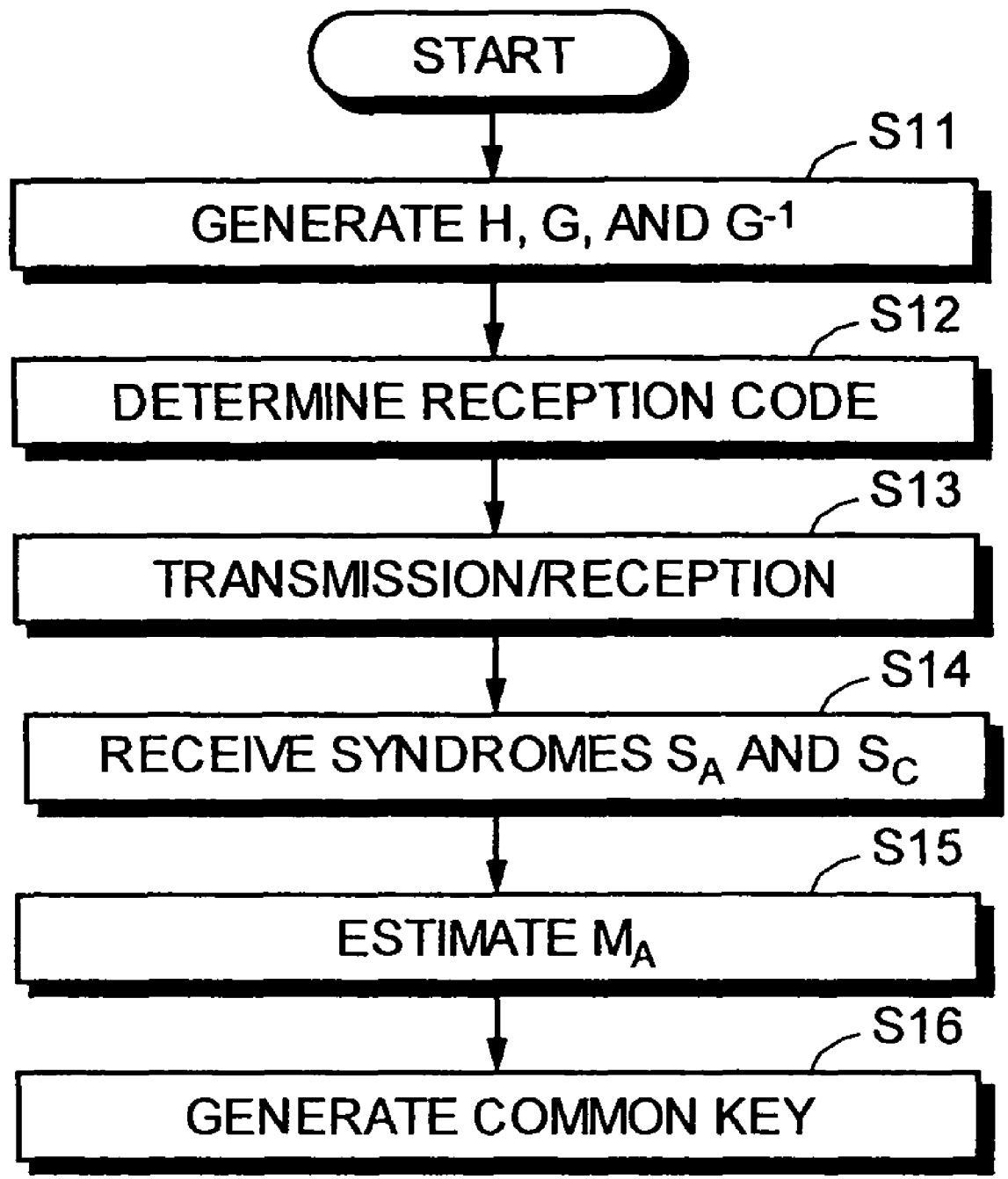
FIG. 3 is a flowchart of quantum key distribution.

Operations of the respective communication apparatuses in the quantum cryptograph system, that is, quantum key distribution according to the present embodiment is explained in detail below. FIGS. 2 and 3 are flowcharts of an outline of the quantum key distribution according to the present embodiment. Specifically, FIG. 2 is a flowchart of processing in the communication apparatus on the transmission side; and FIG. 3 is a flowchart of processing in the communication apparatus on the reception side.

First, in the communication apparatus on the transmission side and the communication apparatus on the reception side, parity-check-matrix generating units 10 and 30 calculate a parity check matrix H (a matrix of n×k) of a specific linear code, calculate a generator matrix G (a matrix of (n−k)×n) satisfying a condition "HG=0" from this parity check matrix H, and calculate an inverse matrix $G^{-1}$ (a matrix of n×(n−k)) of G satisfying a condition $G^{-1} \cdot G = I$ (unit matrix) (step S1 and step S11). In an explanation of the quantum key distribution according to the present embodiment, an LDPC code having an excellent property extremely close to the Shannon limit is used as the specific linear code. Note that, although the LDPC code is used as an error correction system, the present invention is not limited to this and, for example, other linear codes like a turbo code may be used. In addition, for example, if error correction information (a syndrome) described later is an error correction protocol represented by a product $Hm_A$ of an appropriate matrix H and a transmission data $m_A$ (a part of the information $m_a$) (e.g., an error correction protocol equivalent to the "quantum key distribution capable of correcting a data error on a transmission path" explained in the conventional technology), that is, if linearity of the error correction information and the transmission data $m_A$ is secured, the matrix H may be used as the parity check matrix.

Figure 4:
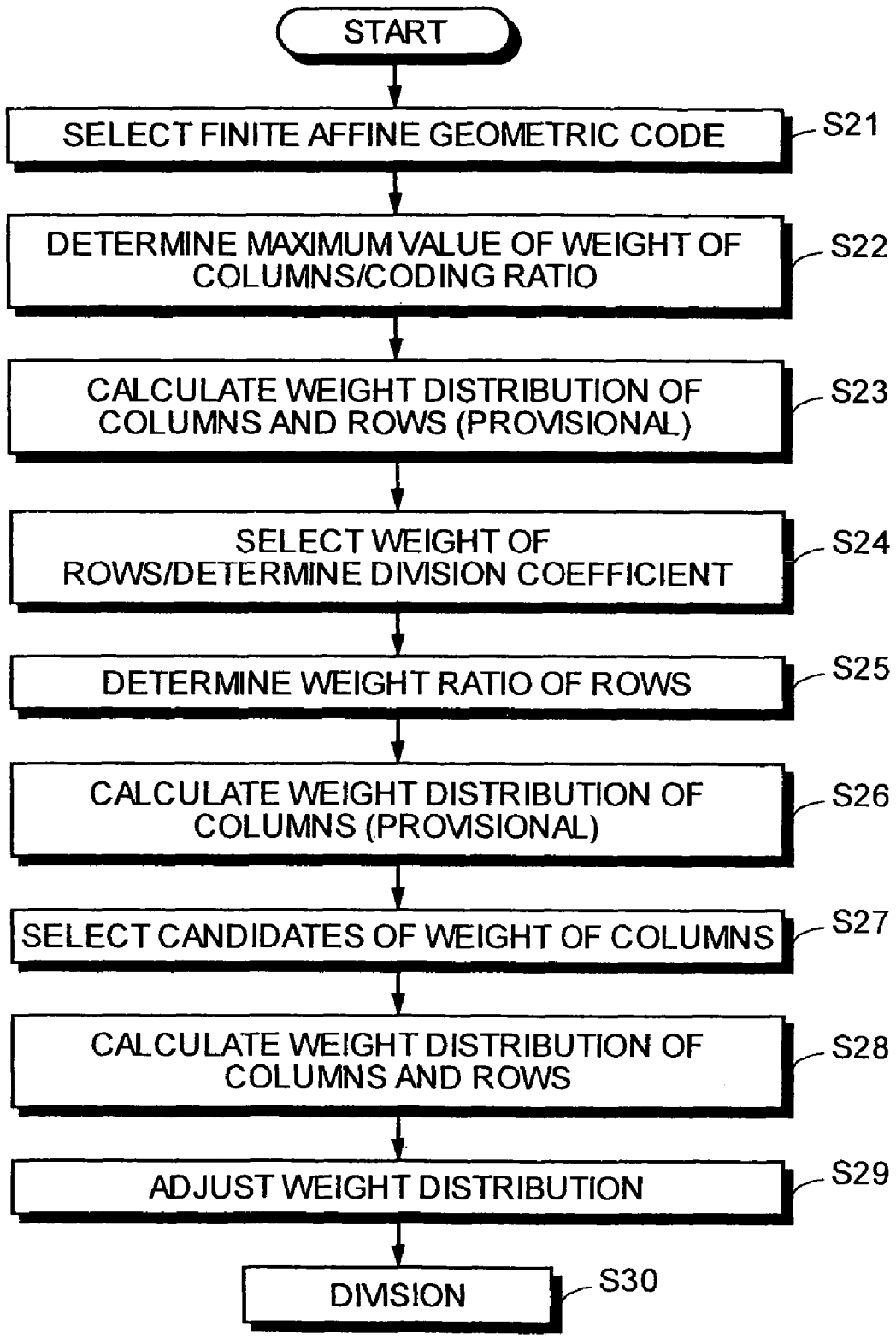
FIG. 4 is a flowchart of a method of forming an "Irregular-LDPC code" based on the finite affine geometry.

A method of forming an LDPC code in the parity-check-matrix generating unit 10, specifically, a method of forming an "Irregular-LDPC code" based on the finite affine geometry (details of step S1 in FIG. 2) is explained. FIG. 4 is a flowchart of a method of forming an "Irregular-LDPC code" based on the finite affine geometry. Note that, since the parity-check-matrix generating unit 30 operates in the same manner as the parity-check-matrix generating unit 10, an explanation of the parity-check-matrix generating unit 30 is omitted. Parity check matrix generation processing according to the present embodiment may be, for example, executed by the parity-check-matrix generating unit 10 or may be executed by another control apparatus (a computer, etc.) outside a communication apparatus depending on parameters to be set. When the parity check matrix generation processing according to the present embodiment is executed outside the communication apparatus, a generated parity check matrix is stored in the communication apparatus. In explanations of the following embodiments, the processing is executed by the parity-check-matrix generating unit 10.

Figure 5:
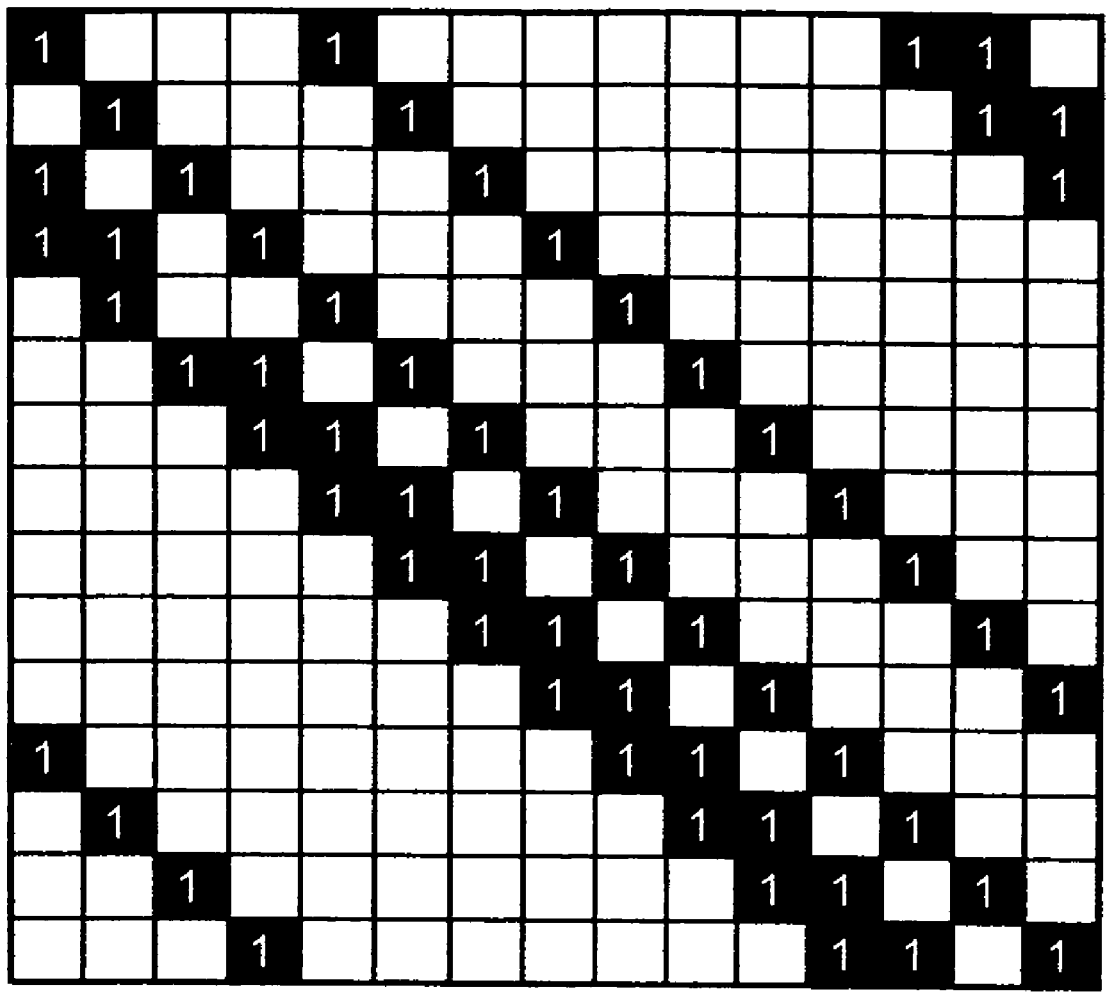
FIG. 5 is a diagram of a matrix of a finite affine geometric code AG $(2, 2^2)$.

The parity-check-matrix generating unit 10 selects a limited affine geometry code AG $(2, 2^s)$ forming a base of a check matrix for an "Irregular-LDPC code" (step S21 in FIG. 4). A row weight and a column weight are $2^s$, respectively. FIG. 5 is a diagram of, for example, a matrix of a limited affine geometry code AG $(2, 2^2)$ (blanks represent 0).

The parity-check-matrix generating unit 10 determines a maximum value $r_1$ $(2 < r_1 \leq 2^s)$ of the column weight (step S22). Then, the parity-check-matrix generating unit 10 determines a coding rate (one syndrome length/a length of a key) (step S22).

The parity-check-matrix generating unit 10 provisionally calculates a column weight distribution $\lambda(\gamma_u)$ and a row weight distribution $\rho_u$ using optimization by the Gaussian Approximation (step S23). Note that a generating function $\rho(x)$ for a row weight distribution is set as $\rho(x) = \rho_u x^{u-1} + (1 - \rho_u) x^u$. A weight u is an integer equal to or larger than 2 and $\rho_u$ represents a ratio of the weight u in a row.

The parity-check-matrix generating unit 10 selects a row weight {u, u+1} that can be formed by division of a row of the limited affine geometry and calculates a division coefficient $\{b_u, b_{u+1}\}$ satisfying Equation (1) below (step S24). Note that $b_u$ and $b_{u+1}$ are assumed to be non-negative integers.

$$b_u + b_{u+1}(u+1) = 2^s \quad (1)$$

Specifically, the parity-check-matrix generating unit 10 calculates $b_u$ from Equation (2) below and calculates $b_{u+1}$ form Equation (1) above.

$$\arg \cdot \min_{bu} \left| \varphi_u - \frac{u \times b_u}{2^s} \right| \quad (2)$$

The parity-check-matrix generating unit 10 calculates ratios $\rho_u'$ and $\rho_{u+1}'$ of the row weight updated by the parameters determined u, u+1, $b_u$, and $b_{u+1}$ according to Equation (3) (step S25).

$$\varphi_u' = \frac{u \times b_u}{2^s} \quad (3)$$

$$\varphi_{u+1}' = \frac{(u+1) \times b_{u+1}}{2^s}$$

The parity-check-matrix generating unit 10 provisionally calculates a column weight distribution $\lambda(\gamma_i)$ using optimization by the Gaussian Approximation and with u, u+1, $\rho_u'$, and $\rho_{u+1}'$ calculated above as fixed parameters (step S26). Note that the weight $\gamma_i$ is an integer equal to or larger than 2 and $\lambda(\gamma_i)$ represents a ratio of the weight $\gamma_i$ in the column. The parity-check-matrix generating unit 10 excludes a weight with the number of columns equal to or smaller than 1 ($\lambda(\gamma_i) \leq \gamma_i/w_t$, i is a positive integer) from column weight candidates. $w_t$ represents a total number of 1 included in AG(2, $2^s$).

The parity-check-matrix generating unit 10 selects a set of column weight candidates $\{\gamma_1, \gamma_2, \ldots, \gamma_1 \, (\gamma_1 \leq 2^s)\}$ that satisfy the weight distribution calculated above and satisfy Equation (4) below (step S27). When a column weight $\gamma_i$ not satisfying Equation (4) is present, the column weight is excluded from the candidates.

$$\begin{bmatrix} a_{1,1} & a_{1,2} & \ldots & a_{1,l} \\ a_{2,1} & a_{2,2} & \ldots & a_{1,l} \\ \vdots & & \ldots & \vdots \end{bmatrix} \begin{bmatrix} \gamma_1 \\ \gamma_2 \\ \vdots \\ \gamma_l \end{bmatrix} = \begin{bmatrix} 2^s \\ 2^s \\ \vdots \\ 2^s \end{bmatrix} \quad (4)$$

Note that the respective a's represent non-negative integer coefficients with respect to $\{\gamma_1, \gamma_2, \ldots, \gamma_1\}$ for forming the column weight $2^s$, i and j are positive integers, $\gamma_i$ represents a column weight, and $\gamma_1$ represents a maximum column weight.

The parity-check-matrix generating unit 10 calculates a column weight distribution $\lambda(\gamma_i)$ and a row weight distribution $\rho_u$ using optimization by the Gaussian Approximation and with u, u+1, $\rho_u'$, $\rho_{u+1}'$, and $\{\gamma_1, \gamma_2, \ldots, \gamma_1\}$ calculated above as fixed parameters (step S28).

Before performing division processing, the parity-check-matrix generating unit 10 adjusts the column weight distribution $\lambda(\gamma_i)$ and the row weight distribution $\rho_u$ (step S29). Note that the respective weight distributions after the adjustment are set to values as close as possible to values calculated by the Gaussian Approximation. FIG. 5 is a table of final column weight distribution $\lambda(\gamma_i)$ and row weight distribution $\rho_u$ at step S29. $n(\gamma_i)$ represents a total number of columns by a unit of weight and $n_u$ represents a total number of rows by a unit of weight.

Finally, the parity-check-matrix generating unit 10 divides rows and columns in the finite affine geometry (step S30) to generate an n×k parity check matrix H. In processing for dividing a finite affine geometric code in the present invention, "1" is extracted from the respective rows or the respective columns at random rather than regularly dividing the rows and the columns. Any method may be used for this extraction processing as long as randomness is maintained.

In this way, according to the present embodiment, the parity check matrix generating can be generated the check matrix H (n×k) for an "Irregular-LDPC code", which is definite and having a stable characteristic, by executing, the method of forming a check matrix for an "Irregular-LDPC code" based on the limited affine geometry (step S1 in FIG. 2).

After the parity check matrix H (an n×k matrix) and the generator matrixes G and $G^{-1}$ ($G^{-1}*G=I$: unit matrix) are generated as described above, it is likely that the communication apparatus on the reception side cannot accurately estimate transmission data $m_A$, in particular, probability of occurrence of misjudgment may be high because of the presence of a wiretapper. Thus, in the communication apparatus on the transmission side, a cyclic-code generating unit 16 generates a cyclic code CRC (Cyclic Redundancy Check) for error detection to reduce the probability of misjudgment as much as possible (step S2 in FIG. 2). The cyclic-code generating unit 16 generates a cyclic code CRC (an n×d matrix) separately from the parity check matrix H generated as described above.

A method of forming the cyclic code CRC (an n×d matrix) in the cyclic-code generating unit 16 (details of step S2 in FIG. 2) is explained.

For example, when a key length n is set to 7, a maximum order d at the time when a primitive polynomial gx on GF(2) is in a polynomial representation is set to 3, and a third-order primitive polynomial gx is calculated as $x^3+x+1$ (vector representation: [1011]) (when an n×d CRC is formed), a check polynomial $x^{d-1}H(x^{-1})$ of the CRC can be represented as indicated by Equation (5) below. A polynomial H(x) is calculated as $(x^n+1)/gx$.

$$H(x) = (x^n + 1)/gx \quad (5)$$
$$= (x^7 + 1)/(x^3 + x + 1)$$
$$= x^4 + x^2 + x + 1 \text{ (vector representation: [10111])}$$

$$H(x^{-1}) = x^{-4} + x^{-2} + x^{-1} + 1$$
$$= x^4 + x^3 + x^2 + 1 \text{ (vector representation: [11101])}$$

$$H^{d-1}H(x^{-1}) = x^2 \times (x^4 + x^3 + x^2 + 1)$$
$$= x^6 + x^5 + x^4 + x^2 \text{ (vector representation: [1110100])}$$

Figures 7, 8:
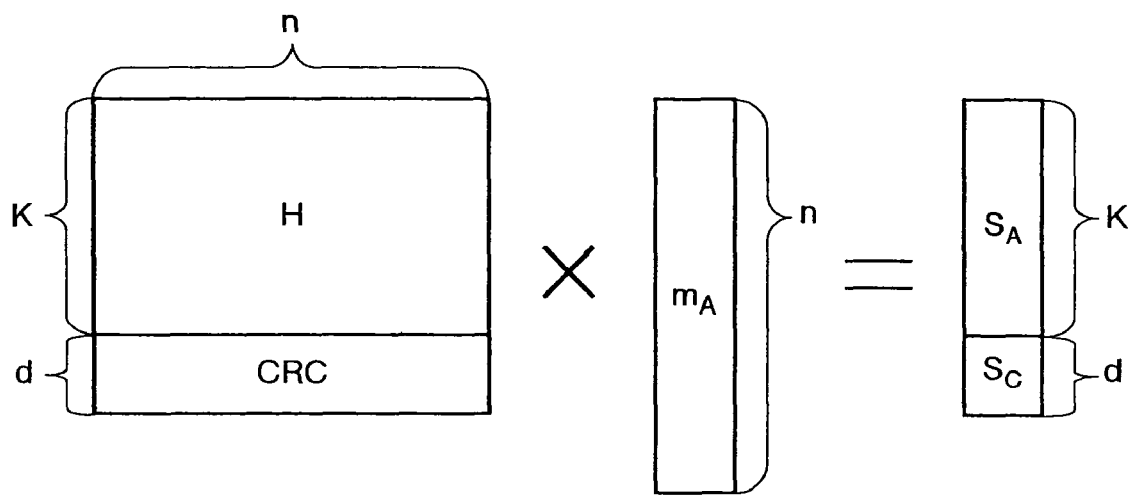
FIG. 7 is a diagram of an example of a cyclic code (an n×d matrix)
FIG. 8 is a schematic of a method of generating a syndrome $S_A$ and a cyclic code syndrome $S_C$ of $m_A$.

Therefore, the cyclic code CRC (an n×d matrix) is an n×d matrix in FIG. 7 obtained by cyclically shifting (d=3) the vector representation [1110100] of the check polynomial $x^{d-1}H(x^{-1})$ of the CRC. FIG. 7 is a diagram of an example of the cyclic code CRC (an n×d matrix).

After the cyclic code CRC (an n×k matrix) is generated as described above, in the communication apparatus on the transmission side, a random-number generating unit 11 generates a random number sequence $m_a$ (a sequence of 1 and 0: transmission data) and determines transmission codes (+: a code corresponding to a measuring device capable of identifying light deflected in the horizontal and vertical directions, x: a code corresponding to a measuring device capable of identifying light polarized in an oblique direction) at random (step S3 in FIG. 2). On the other hand, in the apparatus on the reception side, a random-number generating unit 31 determines reception codes (+: a code corresponding to the measuring device capable of identifying light polarized in the horizontal and vertical directions, x: a code corresponding to the measuring device capable of identifying light polarized in an oblique direction) at random (step S12 in FIG. 3).

Subsequently, in the communication apparatus on the transmission side, a photon generating unit 12 transmits a photon in a polarizing direction automatically determined according to a combination of the random number sequence $m_a$ and the transmission codes (step S4). For example, the photon generating unit 12 transmits light polarized in the horizontal direction according to a combination of 0 and +, light polarized in the vertical direction according to a combination of 1 and +, light polarized in the 45° direction according to a combination of 0 and x, and light polarized in the 135° direction according to a combination of 1 and x to a quantum communication path, respectively (transmission signals).

A photon receiving unit 32 of the communication apparatus on the reception side, which has received light signals of the photon generating unit 12, measures light on the photon communication path (reception signals). The photon receiving unit 32 obtains reception data $m_b$ automatically determined according to a combination of a reception code and a reception signal (step S13). The photon receiving unit 32 obtains, as the reception data $m_b$, 0, 1, 0, and 0 according to a combination of the light polarized in the horizontal direction and +, a combination of the light polarized in the vertical direction and +, a combination of the light polarized in the 45° direction and x, and a combination of the light polarized in the 135° direction and x, respectively. The reception data $m_b$ is assumed to be a hard decision value with probability information.

In the communication apparatus on the reception side, to check whether the measurement is performed by a correct measuring device, the random-number generating unit 31 transmits a reception code to the communication apparatus on the transmission side via a public communication path (step S13). The communication apparatus on the transmission side, which has received the reception code, checks whether the measurement is performed by a correct measuring device and transmits a result of the check to the communication apparatus on the reception side via the public communication path (step S4). The communication apparatus on the reception side and the communication apparatus on the transmission side keep only data corresponding to a reception signal received by the correct measuring device and discard the other data (steps S4 and S13). Thereafter, the communication apparatus on the reception side and the communication apparatus on the transmission side store the data kept in memories or the like, read out n bits in order from the top of the data, and set the n bits of data as formal transmission data $m_A$ and formal reception data $m_B$ ($m_B$ is $m_A$ affected by noise and the like on the transmission path: $m_B=m_A+e$ (noise and the like)). In other words, the communication apparatus on the reception side and the communication apparatus on the transmission side read out the next n bits as required and generate the transmission data $m_A$ and the reception data $m_B$. According to the present embodiment, the communication apparatus on the reception side and the communication apparatus on the transmission side can share bit positions of the data kept. Like the reception data $m_b$, the reception data $m_B$ is a hard decision value with probability information.

In the communication apparatus on the transmission side, a syndrome generating unit 14 connects the parity check row H (an n×k matrix) and the cyclic code CRC (an n×d matrix), calculates a syndrome $S_A=H \times m_A$ and a cyclic code syndrome $S_C=CRC \times m_A$ of $m_A$ using a matrix after connection and transmission data $m_A$, and notifies the communication apparatus on the reception side of a result of the calculation via a public-communication-path communication unit 13 and the public communication path (step S5). FIG. 8 is a schematic of a method of generating the syndrome $S_A$ and the cyclic code syndrome $S_C$ of $m_A$. At this stage, it is likely that the syndrome $S_A$ (information for k bits) and the cyclic code syndrome $S_C$ (information for d bits) of $m_A$ are learnt by a wiretapper. On the other hand, in the communication apparatus on the reception side, a public-communication-path communication unit 34 receives the syndrome $S_A$ and the cyclic code syndrome $S_C$ of $m_A$ and notifies a syndrome decoding unit 33 of the syndrome $S_A$ and the cyclic code syndrome $S_C$ (step S14).

The syndrome decoding unit 33 estimates the original transmission data $m_A$ using a syndrome decoding method according to the present embodiment (step S15). Specifically, the syndrome decoding unit 33 generates an estimated word $m_C$ by correcting an error of the hard decision value $m_B$ with probability information due to noise and the like and, if there is no error in the estimated word $m_C$, judges that the estimated word $m_C$ is the original transmission data $m_A$. According to the present embodiment, the syndrome decoding unit 33 estimates $m_C$ satisfying "$S_A=Hm_C$" from the hard decision value $m_B$ with probability information and, if there is no error in $m_C$ as a result of the estimation, sets $m_C$ as the shared information $m_A$. The syndrome decoding method according to the present embodiment is explained below in detail.

Figure 9:
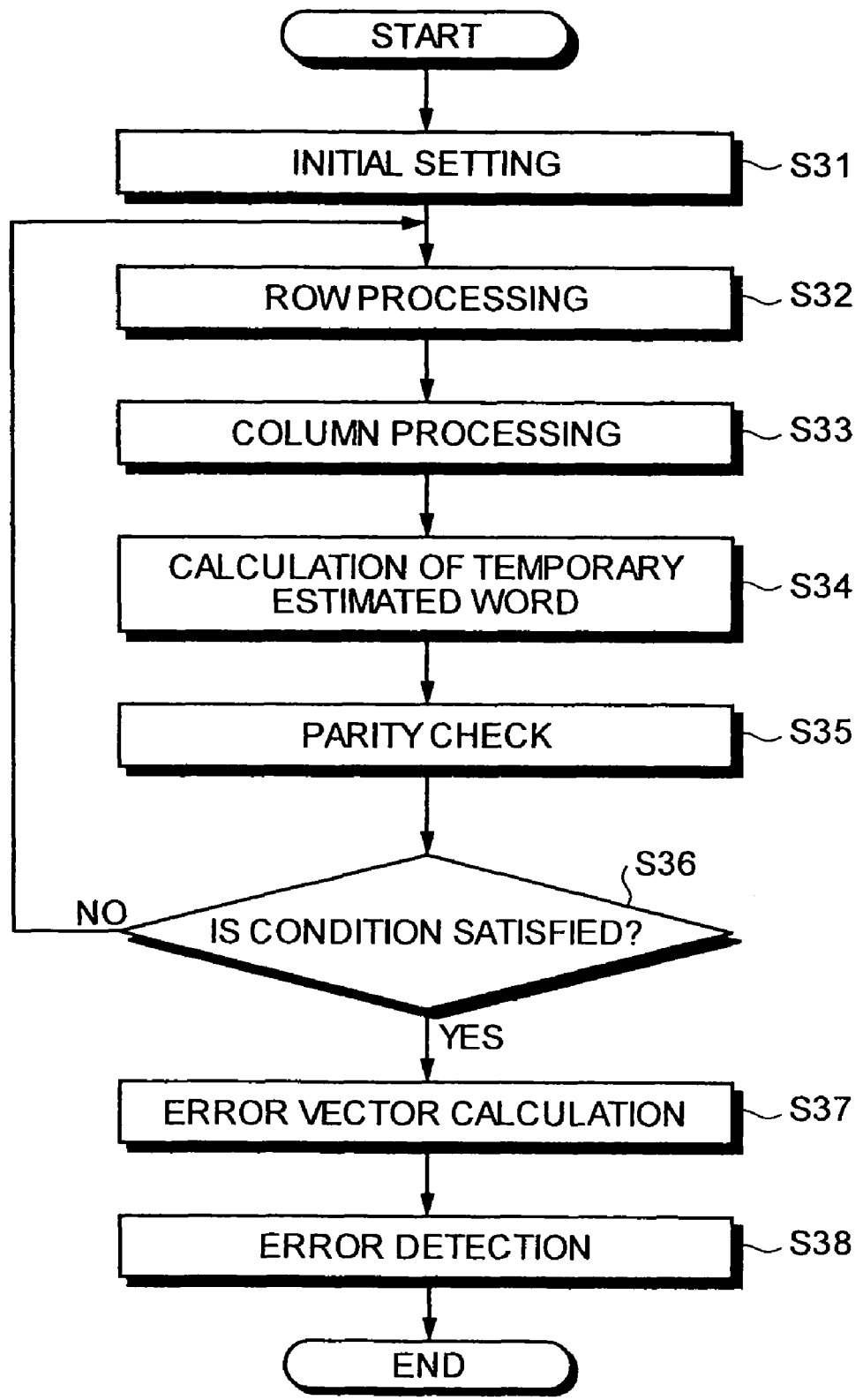
FIG. 9 is a flowchart of a syndrome decoding method according to an embodiment of the present invention.
Figure 10:
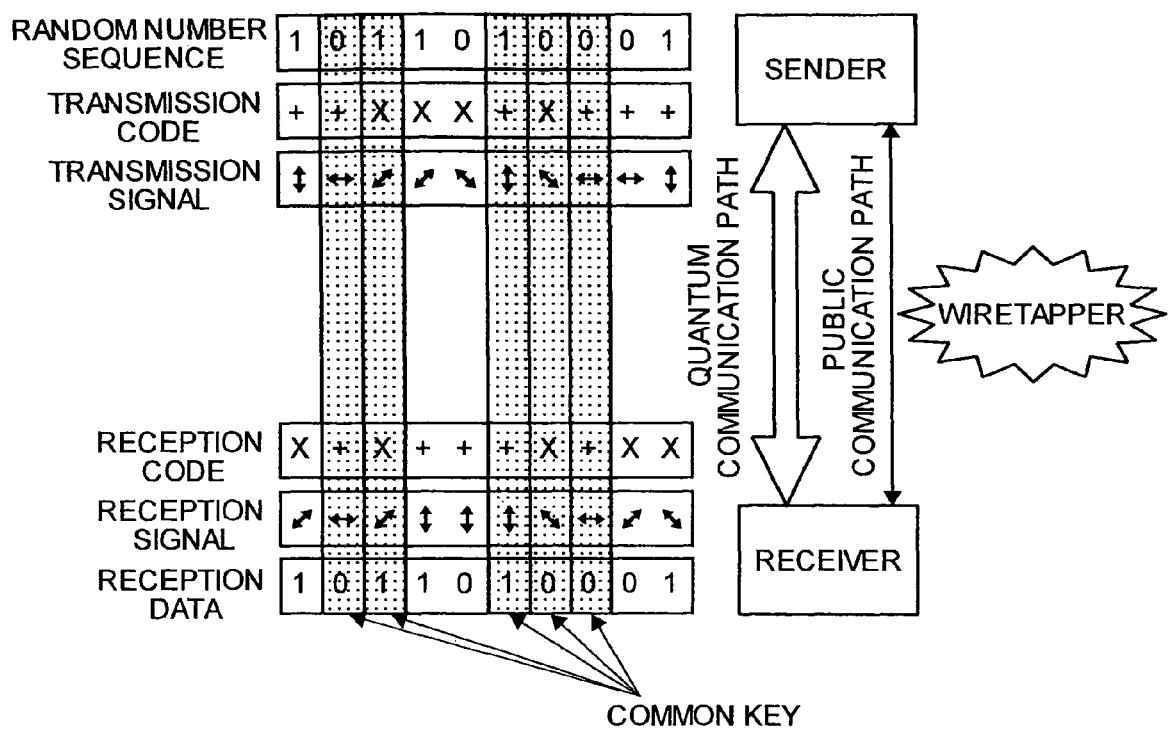
FIG. 10 is a diagram of conventional quantum key distribution that uses polarization.

FIG. 9 is a flowchart of the syndrome decoding method according to the present embodiment. As described above, when the binary n (columns)×k (rows) check matrix H is assumed as described above, an elements in an i-th column ($1 \leq i \leq n$) and a j-th row ($1 \leq i \leq k$) is represented as $H_{ij}$. The reception data $m_B$ is set as ($m_{B1}, m_{B2}, \ldots, m_{Bn}$) and the estimated word (a hard decision value) $m_C$ is set as ($m_{C1}, m_{C2}, \ldots, m_{Cn}$). The syndrome $S_A$ of $m_A$ is set as "$S_{A1}, S_{A2}, \ldots, S_{Ak}$". As a communication path, a non-storage communication path described by conditional probability $P(m_B|m_C=m_A)$ is assumed.

First, the syndrome decoding unit 33 sets, as initial setting, prior values of all combinations (i, j) of rows and columns satisfying $H_{ij}=1$ as $q_{ij}(0)=\frac{1}{2}$ and $q_{ij}(1)=\frac{1}{2}$. $q_{ij}(0)$ represents probability that $H_{ij}$ is "0" and $q_{ij}(1)$ represents probability that $H_{ij}$ is "1". The syndrome decoding unit 33 sets a counter value 1 indicating the number of times of iteration of decoding as 1 (iteration: once) and further sets a maximum number of times of iteration $1_{max}$ (step S31).

Subsequently, the syndrome decoding unit 33 updates external values $r_{ij}(0)$ and $r_{ij}(1)$ for all the combinations (i, j) of rows and columns satisfying $H_{ij}=1$ in an order of j=1, 2, ..., k (step S32). According to the present embodiment, for example, when a j-th ($1 \leq j \leq k$) syndrome $S_{Aj}$ is "0", the syndrome decoding unit 33 updates the external values $r_{ij}(0)$ and $r_{ij}(1)$ using update Equations (6) and (7).

$$r_{ij}(0)=K \times \Sigma(\Pi q_{i'j}(m_{Ci'})P(m_{Bi'}|m_{Ci'}))$$

$$M_{Ci'} \in 0,1$$

$$\Sigma M_{Ci'}=0$$

$$i' \in A(i) \backslash j \tag{6}$$

$$r_{ir}(1) = K \times \Sigma(\Pi q_{i'j}(m_{Ci'}) P(m_{Bi'}|m_{Ci'}))$$

$$M_{Ci'} \in 0,1$$

$$\Sigma M_{Ci'} = 1$$

$$i' \in A(i) \backslash j \quad (7)$$

On the other hand, when the j-th ($1 \leq j \leq k$) syndrome $S_{Aj}$ is "1", the syndrome decoding unit 33 updates the external values $r_{ij}(0)$ and $r_{ij}(1)$ using update Equations (8) and (9).

$$r_{ir}(0) = K \times \Sigma(\Pi q_{i'j}(m_{Ci'}) P(m_{Bi'}|m_{Ci'}))$$

$$M_{Ci'} \in 0,1$$

$$\Sigma M_{Ci'} = 1$$

$$i' \in B(j) \backslash i \quad (8)$$

$$r_{ir}(1) = K \times \Sigma(\Pi q_{i'j}(m_{Ci'}) P(m_{Bi'}|m_{Ci'}))$$

$$M_{Ci'} \in 0,1$$

$$\Sigma M_{Ci'} = 0$$

$$i' \in B(j) \backslash i \quad (9)$$

K in the Equations is assumed to be a value defined to establish (a value for normalizing) "$r_{ij}(0) + r_{ij}(1) = 1$". $P(m_B|m_C)$ in the Equations represents conditional probability, that is, probability of the reception data $m_B$ at the time when the estimated word $m_C$ is "0" OR "1". A subset A(i) in the Equations represents a set of row indexes with "1" set in the i-th column of the check matrix H. A subset B(j) represents a set of column indexes with "1" set in the j-th row of the check matrix H.

Specifically describing the update processing, for example, when all combinations (i, 1) of columns and rows satisfying $S_{Aj}=0$, j=1, and $H_{i1}=1$ are (3, 1), (4, 1), and (5, 1), Equations (6) and (7) are applied and external values $r_{31}(0)$ and $r_{31}(1)$ are updated as indicated by Equations (10) and (11). In other words, the external values $r_{31}(0)$ and $r_{31}(1)$ are updated using H41 and H51 except H31. Probability that a value in a third column and a first row of the check matrix H is "0" and probability that the value is "1" are calculated, respectively.

$$r_{31}(0) = K \times \{q_{41}(m_{C4}=0) P(m_{B4}|m_{C4}=0) \times q_{51}(m_{C5}=0) P(m_{B5}|m_{C5}=0) + q_{41}(m_{C4}=1) P(m_{B4}|m_{C4}=1) \times q_{51}(m_{C5}=1) P(m_{B5}|m_{C5}=1)\} \quad (10)$$

$$r_{31}(0) = K \times \{q_{41}(m_{C4}=1) P(m_{B4}|m_{C4}=1) \times q_{51}(m_{C5}=0) P(m_{B5}|m_{C5}=0) + q_{41}(m_{C4}=0) P(m_{B4}|m_{C4}=0) \times q_{51}(m_{C5}=1) P(m_{B5}|m_{C5}=1)\} \quad (11)$$

Subsequently, the syndrome decoding unit 33 updates the prior values $q_{ij}(0)$ and $q_{ij}(1)$ for all the combinations (i, j) of rows and columns satisfying $H_{ij}=1$ in an order of i=1, 2, ..., n (step S33). This update processing can be represented by Equations (12) and (13).

$$q_{ij}(0) = K' \times \Pi r_{ij'}(0)$$

$$j' = A(i) \backslash j \quad (12)$$

$$q_{ij}(1) = K' \times \Pi r_{ij'}(1)$$

$$j' = A(i) \backslash j \quad (13)$$

K' in the Equations is assumed to be a value defined to establish (a value for normalizing) "$q_{ij}(0) + q_{ij}(1) = 1$".

Specifically describing the update processing, for example, when all combinations (3, j) of columns and rows satisfying i=1 and $H_{i1}=1$ are (3, 1), (3, 2), and (3, 3), Equations (12) and (13) are applied and prior values $q_{31}(0)$ and $q_{31}(1)$ are updated as indicated by Equations (14) and (15). In other words, the prior values $q_{31}(0)$ and $q_{31}(1)$ are updated using H31 and H33 except H31.

$$q_{31}(0) = K' \times \{r_{32}(0) \times r_{33}(0)\} \quad (14)$$

$$q_{31}(1) = K' \times \{r_{32}(1) \times r_{33}(1)\} \quad (15)$$

Subsequently, the syndrome decoding unit 33 calculates posterior probability (conditional probability×prior values) $Q_i(0)$ and $Q_i(1)$ and calculates a temporary estimated word $m_C' = (m_{C1}', m_{C2}', \ldots, m_{Cn}')$ (step S34). In other words, the syndrome decoding unit 33 obtains a temporary estimated word in Equation (18) based on results of calculation of Equations (16) and (17). The syndrome decoding unit 33 performs judgment processing every time iteration is performed once.

$$Q_i(0) = K'' P(m_{Bi} | m_{Ci} = 0) \prod r_{ij'}(0) \quad (16)$$

$$j' \in A(i)$$

$$Q_i(1) = K'' \times P(m_{Bi} | m_{Ci} = 1) \prod r_{ij'}(1) \quad (17)$$

$$j' \in A(i)$$

$$m_{Ci'} = \begin{cases} 0 : \text{if } Q_i(0) \geq Q_i(1) \\ 1 : \text{if } Q_i(0) < Q_i(1) \end{cases} \quad (18)$$

K" in the Equations is assumed to be a value defined to establish (a value for normalizing) "$Q_i(0) + Q_i(1) = 1$". Conditional probability $P(m_B|m_C=0)$ is defined as indicated by Equations (19) and (20) and p represents a bit error rate.

$$P(m_{Bi'} | m_{Ci'} = 0) = \begin{cases} 1 - p(m_{Bi'} = 0) \\ p(m_{Bi'} = 1) \end{cases} \quad (19)$$

$$P(m_{Bi'} | m_{Ci'} = 1) = \begin{cases} p(m_{Bi'} = 0) \\ 1 - p(m_{Bi'} = 1) \end{cases} \quad (20)$$

The syndrome decoding unit 33 checks whether the temporary estimated word $m_C'$ can be the transmission data $m_A$ (step S35). For example, if $m_C' = (m_{C1}', m_{C2}', \ldots, m_{Cn}')$ satisfies a condition "$m_C' \times H^T = S_A$" ("Yes" at step S36), the syndrome decoding unit 33 outputs $m_C'$ as the estimated word $m_C$ ($m_{C1}, m_{C2}, \ldots, m_{Cn}$).

On the other hand, when the condition is not satisfied and $l < l_{max}$ ("No" at step S36), the syndrome decoding unit 33 increments the counter value l and executes the processing at step S32 again using the updated value. Thereafter, the syndrome decoding unit 33 repeatedly executes the processing at steps S32 to S36 using updated values until the condition is satisfied (in the range of $l < l_{max}$).

The syndrome decoding unit 33 compares (EXOR) the estimated word $m_C(m_{C1}, m_{C2}, \ldots, m_{Cn})$ and reception data $m_B = (m_{B1}, m_{B2}, \ldots, m_{Bn})$ and outputs an error vector (corresponding to e of the reception data $m_B = m_A + e$ (noise and the like)) (step S37).

It is likely that error judgment is caused by presence of a plurality of estimated words $m_C$ satisfying "$H \times m_C = S_A$" (when H and $S_A$ are fixed, there are $2^{n-k}$ entropies of $m_C$) and the transmission data $m_A$ cannot be correctly estimated (the transmission data $m_A$ and the estimated word $m_C$ judged to be correct do not coincide with each other). Thus, the syndrome decoding unit 33 performs error detection for the estimated word $m_C$ (step S38). The syndrome decoding unit 33 compares the cyclic code syndrome $S_C$=CRC×$m_A$ received at step S14 and an estimated cyclic code syndrome $S_C'$ in Equation (21). If $S_C$ is equal to $S_C'$, the syndrome decoding unit 33 judges that there is no error in the estimated word $m_C$, outputs the estimated word $m_C$=($m_{C1}$, $m_{C2}$, . . . , $m_{Cn}$) as the original transmission data $m_A$=($m_{A1}$, $m_{A2}$, . . . , $m_{An}$), and ends an algorithm shown in FIG. 9. On the other hand, if $S_C$ is not equal to $S_C'$, the syndrome decoding unit 33 judges that there is an error in the estimated word $m_C$ and discards the estimated word $m_C$.

$$S_C'=rem(m_C/gx) \quad (21)$$

In the Equation, rem represents a remainder of the division $m_C$/gx on GF(2).

In this way, in the syndrome decoding method adopted in the quantum key distribution according to the present embodiment, "exchange of parities performed an enormous number of times (binary search) for specifying an error bit" that occurs in error correction described in the conventional technology is eliminated. Error correction is performed using parity check matrixes for an LDPC code having an extremely high characteristic (error correction ability). This makes it possible to generate a common key, security of which is highly guaranteed, while correcting a data error on a transmission path in a short time.

According to the present embodiment, the cyclic code syndrome $S_C$ generated by the communication apparatus on the transmission side and the estimated cyclic code syndrome $S_C'$ generated based on the estimated word $m_C$ are compared to perform error detection for the estimated word $m_C$. This makes it possible to substantially reduce error judgment probability for the estimated word $m_C$ judged from the reception data $m_B$. In other words, it is possible to accurately estimate the original transmission data $m_A$.

According to the present embodiment, the reception data $m_B$ and $m_b$ are hard decision values with probability information. However, the reception data $m_B$ and $m_b$ may be soft decision values.

After the transmission data $m_A$ is estimated as described above, finally, in the communication apparatus on the reception side, a common-key generating unit 35 discards a part of the shared information ($m_A$) according to error correction information laid open to the public (the information for k bits that is likely to have been wiretapped: $S_A$) and generates an encryption key r having an amount of information for b-k bits (step S16 in FIG. 3). In other words, the common-key generating unit 35 generates the encryption key r according to Equation (22) below using $G^{-1}$(n×(n-k)) calculated earlier. The communication apparatus on the reception side uses the encryption key r as a common key to be shared with the communication apparatus on the transmission side.

$$r=G^{-1}m_A \quad (22)$$

On the other hand, in the communication apparatus on the transmission side, a common-key generating unit 15 discards a part of the shared information ($m_A$) according to error correction information laid open to the public (the information for k bits that is likely to have been wiretapped: $S_A$) and generates an encryption key r having an amount of information for n-k bits (step S6 in FIG. 2). In other words, the common-key generating unit 15 generates the encryption key r according to Equation (22) above using $G^{-1}$(n×(n-k)) calculated earlier (step S6). The communication apparatus on the transmission side uses the encryption key r as a common key to be shared with the communication apparatus on the reception side.

Moreover, according to the present embodiment, the common key may be permuted using a regular random matrix R. This makes it possible to reinforce confidentiality. Specifically, first, the communication apparatus on the transmission side generates the regular random matrix R (an (n-k)×(n-k) matrix) and notifies the communication apparatus on the reception side of the regular random matrix R via the public communication path. This processing may be performed in the communication apparatus on the reception side. Thereafter, the communication apparatuses on the transmission side and the reception side generate the encryption keys r according to Equation (23) using $G^{-1}$(n×(n-k)) calculated earlier.

$$r=RG^{-1}m_A \quad (23)$$

As described above, according to the present embodiment, a data error of shared information is corrected using parity check matrixes for an "Irregular-LDPC code", which are definite and have stable characteristics, error detection for shared information (estimated word) is performed using the cyclic code CRC, and, thereafter, a part of the shared information is discarded according to error correction information laid open to the public. Consequently, exchange of parities performed an enormous number of times for specifying and correcting an error bit is eliminated and error correction control is performed simply by transmitting the error correction information. Thus, it is possible to substantially reduce time required for error correction processing.

Furthermore, according to the present embodiment, the communication apparatus on the reception side performs error detection for an estimated word using error detection information generated by the communication apparatus on the transmission side. This makes it possible to substantially reduce misjudgment probability for the estimated word and accurately estimate original transmission data.

Moreover, according to the present embodiment, since a part of shared information is discarded according to information laid open to the public, it is possible to generate a common key, security of which is highly guaranteed.

Furthermore, according to the present embodiment, the inverse matrix $G^{-1}$ (n×(n-k)) is generated from the generator matrix G ((n-k)×n) satisfying HG=0 ($G^{-1}$*G=I (unit matrix)) and a part (k) of shared information (n) is discarded using the inverse matrix $G^{-1}$ to generate the encryption key r having an amount of information for n-k bits. However, the present invention is not limited to this. A part of the shared information (n) may be discarded to generate an encryption key r having an amount of information for m (m≦n-k) bits. Specifically, a map F(·) for mapping an n-dimensional vector to an m-dimensional vector is assumed. To guarantee security of a common key, F(·) needs to satisfy a condition that the number of elements of a reverse image $(F·G)^{-1}(v)$ in a combined map F·G of the map F and the generator matrix G is fixed ($2^{n-k-m}$) with respect to an arbitrary m-dimensional vector v regardless of v. In this case, the common key r is F($m_A$).

Moreover, according to the present embodiment, in the processing at steps S6 and S16, a part of shared information may be discarded using a characteristic of the parity check matrix H without using the generator matrix $G^{-1}$. Specifically, first, the common-key generating units 15 and 35 apply random permutation to rows of the parity check matrix H generated at steps S1 and S11. Then, the common-key generating units 15 and 35 exchange information on bits to be discarded between the communication apparatuses via the public communication path. For example, the common-key generating units 15 and 35 select specific "1" from a first column of an original finite affine geometry AG (2, $2^s$) and exchange a position of "1" via the public communication path. Thereafter, the common-key generating units 15 and 35 specify, from the parity check matrix after permutation, a position after division corresponding to "1" and a position after division corresponding to "1" in respective columns cyclically shifted, discard bits in the shared information $m_A$ corresponding to the positions specified, and set the remaining data as the encryption key r. This makes it possible to eliminate complicated arithmetic processing for the generator matrixes G and $G^{-1}$.

INDUSTRIAL APPLICABILITY

As described above, the quantum key distribution method and the communication apparatus according to the present invention are useful as a technology for generating a common key, security of which is highly guaranteed. In particular, the quantum key distribution method and the communication apparatus are suitable for communication on a transmission path on which a wiretapper is likely to be present.

The invention claimed is:

1. A quantum-key distributing method for a quantum cryptographic system including a transmission-side communication apparatus that transmits a random number sequence forming a basis of an encryption key in a predetermined quantum state on a quantum communication path and a reception-side communication apparatus that measures a photon on the quantum communication path, the quantum-key distributing method comprising: transmitting and receiving including the reception-side communication apparatus maintaining reception data with probability information obtained as a result of measuring a light direction with a measuring device for correctly identifying the light direction; and the transmission-side communication apparatus maintaining transmission data corresponding to the reception data; information notifying including the transmission-side communication apparatus notifying, via a public communication path, the reception-side communication apparatus of error correction information generated based on a parity check matrix, of which elements are "0" or "1", and the transmission data and error detection information generated based on a cyclic code for detecting an error and the transmission data; transmission-data estimating including the reception-side communication apparatus estimating the transmission data based on a same parity check matrix as that of the transmission-side communication apparatus, the reception data with probability information, the error correction information, and the error detection information; and encryption-key generating including the transmission-side communication apparatus and the reception-side communication apparatus discarding a part of the transmission data according to an amount of information laid open to the public communications path and generating an encryption key using rest of the transmission data.

2. The quantum-key distributing method according to claim 1, wherein
the transmission-data estimating includes
setting a prior value corresponding to an element "1" in the parity check matrix as initial setting;
executing, row by row, a first process of updating, an external value corresponding to the element "1" in the parity check matrix using a prior value corresponding to another element "1" in an identical row and the probability information according to the error correction information;
executing, column by column, a second process of updating the prior value corresponding to the element "1" in the parity check matrix using an external value after the update corresponding to another element "1" in an identical column;
calculating posterior probability based on the probability information and the prior value after the update and judging a temporary estimated word from the posterior probability; and
detecting, when the temporary estimated word satisfies a predetermined condition established between the temporary estimated word and the parity check matrix, an error for the temporary word using the error detection information, judging, if there is no error, that the temporary estimated word is original transmission data, and repeatedly executing, when the temporary estimated word does not satisfy the predetermined condition, the first process, the second process, and a process of judging the temporary estimated word using the value after the update until the condition is satisfied.

3. The quantum-key distributing method according to claim 2, wherein
the transmission-data estimating includes
comparing the error detection information and estimated error detection information generated using the temporary estimated word,
judging, if the error detection information and the estimated error detection information coincide with each other, that there is no error in the temporary estimated word, and
judging, if the error detection information and the estimated error detection information do not coincide with each other, that there is an error in the temporary estimated word.

4. A communication apparatus that constitutes a quantum cryptographic system in which apparatuses share an encryption key through quantum key distribution, and transmits a random number sequence forming a basis of the encryption key to a quantum communication path in a predetermined quantum state, the communication apparatus comprising: an information notifying unit that notifies, via a public communication path, the other apparatus of error correction information and error detection information, the error correction information being generated based on transmission data corresponding to reception data of the other apparatus obtained as a result of measuring a light direction with a measuring device for correctly identifying the light direction and a same parity check matrix as that of the other apparatus, the error detection information being generated based on the transmission data and a cyclic code for detecting an error; and an encryption-key generating unit that discards a part of the transmission data according to an amount of information laid open to the public communications path, and generates an encryption key using rest of the transmission data.

5. A communication apparatus that constitutes a quantum cryptographic system in which apparatuses share an encryption key through quantum key distribution, and measures a photons, which is a random number sequence forming a basis of the encryption key, on a quantum communication path, the communication apparatus comprising: a transmission-data estimating unit that estimates original transmission data based on a parity check matrix identical to that of other apparatus that shares the encryption key, reception data with probability information obtained by measuring a light direction with a measuring device for correctly identifying the light direction, and error correction information and error detection information received from other apparatus via a public communication path; and an encryption-key generating unit that discards a part of the transmission data according to an amount of information laid open to the public communications path, and generates an encryption key using rest of the transmission data.

6. The communication apparatus according to claim 5, wherein
the transmission-data estimating unit performs
setting a prior value corresponding to an element "1" in the parity check matrix as initial setting,
executing, row by row, a first process of updating, an external value corresponding to the element "1" in the parity check matrix using a prior value corresponding to another element "1" in an identical row and the probability information according to the error correction information,
executing, column by column, a second process of updating the prior value corresponding to the element "1" in the parity check matrix using an external value after the update corresponding to another element "1" in an identical column,
calculating posterior probability based on the probability information and the prior value after the update and judging a temporary estimated word from the posterior probability, and
detecting, when the temporary estimated word satisfies a predetermined condition established between the temporary estimated word and the parity check matrix, an error for the temporary word using the error detection information, judging, if there is no error, that the temporary estimated word is original transmission data, and repeatedly executing, when the temporary estimated word does not satisfy the predetermined condition, the first process, the second process, and a process of judging the temporary estimated word using the value after the update until the condition is satisfied.

7. The communication apparatus according to claim 6, wherein
the transmission-data estimating unit performs
comparing the error detection information and estimated error detection information generated using the temporary estimated word,
judging, if the error detection information and the estimated error detection information coincide with each other, that there is no error in the temporary estimated word, and
judging, if the error detection information and the estimated error detection information do not coincide with each other, that there is an error in the temporary estimated word.

* * * * *